(12) United States Patent
Browne et al.

(10) Patent No.: US 8,069,963 B2
(45) Date of Patent: Dec. 6, 2011

(54) VARIABLE RESISTANCE STRUT ASSEMBLIES AND ARTICLES CONTAINING THE SAME

(75) Inventors: Alan L. Browne, Grosse Pointe, MI (US); Nancy L. Johnson, Northville, MI (US); Nilesh D. Mankame, Sterling Heights, MI (US); John C. Ulicny, Oxford, MI (US); Gary L. Jones, Farmington Hills, MI (US); James C. O'Kane, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/788,831

(22) Filed: May 27, 2010

(65) Prior Publication Data

US 2010/0236881 A1    Sep. 23, 2010

Related U.S. Application Data

(62) Division of application No. 12/210,674, filed on Sep. 15, 2008, now abandoned, which is a division of application No. 11/077,179, filed on Mar. 10, 2005, now abandoned.

(60) Provisional application No. 60/552,791, filed on Mar. 12, 2004.

(51) Int. Cl.
*F16F 9/34* (2006.01)
(52) U.S. Cl. ............... 188/322.15; 188/317; 188/322.22
(58) Field of Classification Search ............. 188/322.15, 188/322.14, 322.22, 267.276, 282.1, 317, 188/319.1; 251/324, 325, 4, 7, 11; 138/45, 138/46
See application file for complete search history.

(56) References Cited

U.S. PATENT DOCUMENTS

| | | | | |
|---|---|---|---|---|
| 4,799,577 A | * | 1/1989 | de Carbon | 188/277 |
| 5,029,677 A | * | 7/1991 | Mitsui | 188/267.1 |
| 5,100,166 A | * | 3/1992 | Mitsui | 280/5.515 |

FOREIGN PATENT DOCUMENTS

FR    2607890 A1 *  6/1988
JP    10318429 A  * 12/1998

* cited by examiner

*Primary Examiner* — Robert Siconolfi
*Assistant Examiner* — Mariano Sy
(74) *Attorney, Agent, or Firm* — Quinn Law Group, PLLC

(57) ABSTRACT

Disclosed herein is a strut assembly that comprises a piston that is in slideable communication with a housing. The piston comprises a piston head having a channel in operative communication with a fluid that is disposed in the housing. An elastic member and an active element are disposed in the channel. The active element is in operative communication with the elastic member and is operative to change the shape of the elastic member.

19 Claims, 4 Drawing Sheets

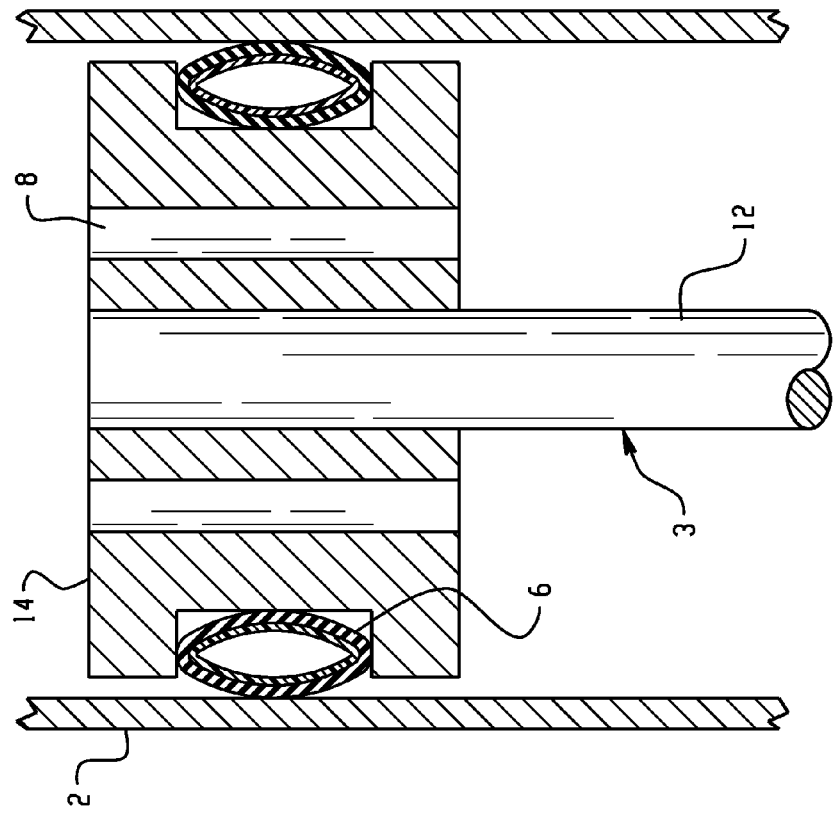
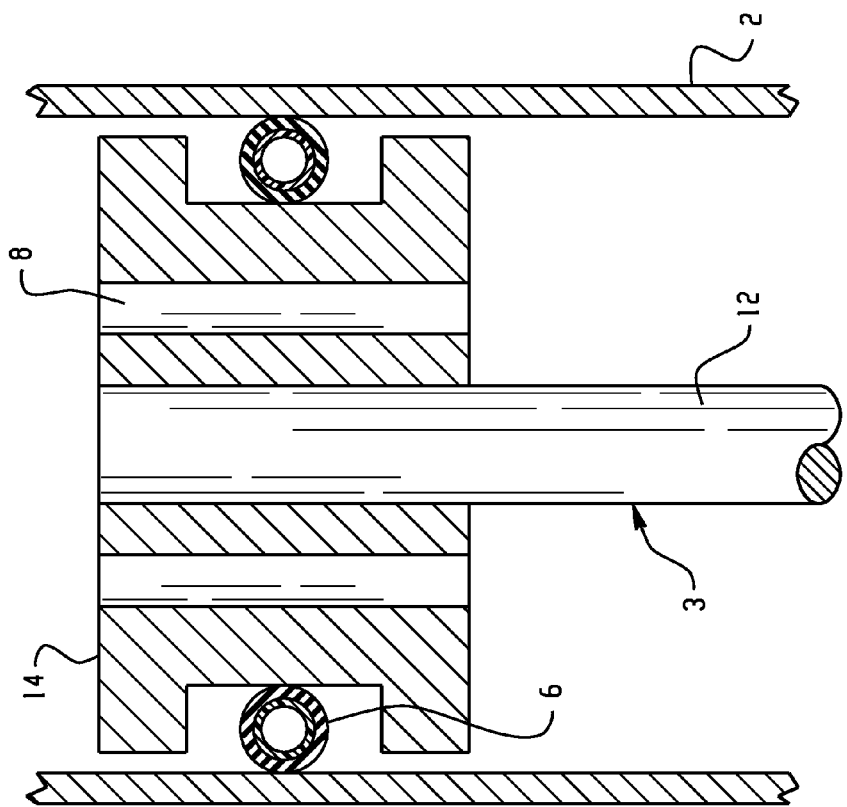

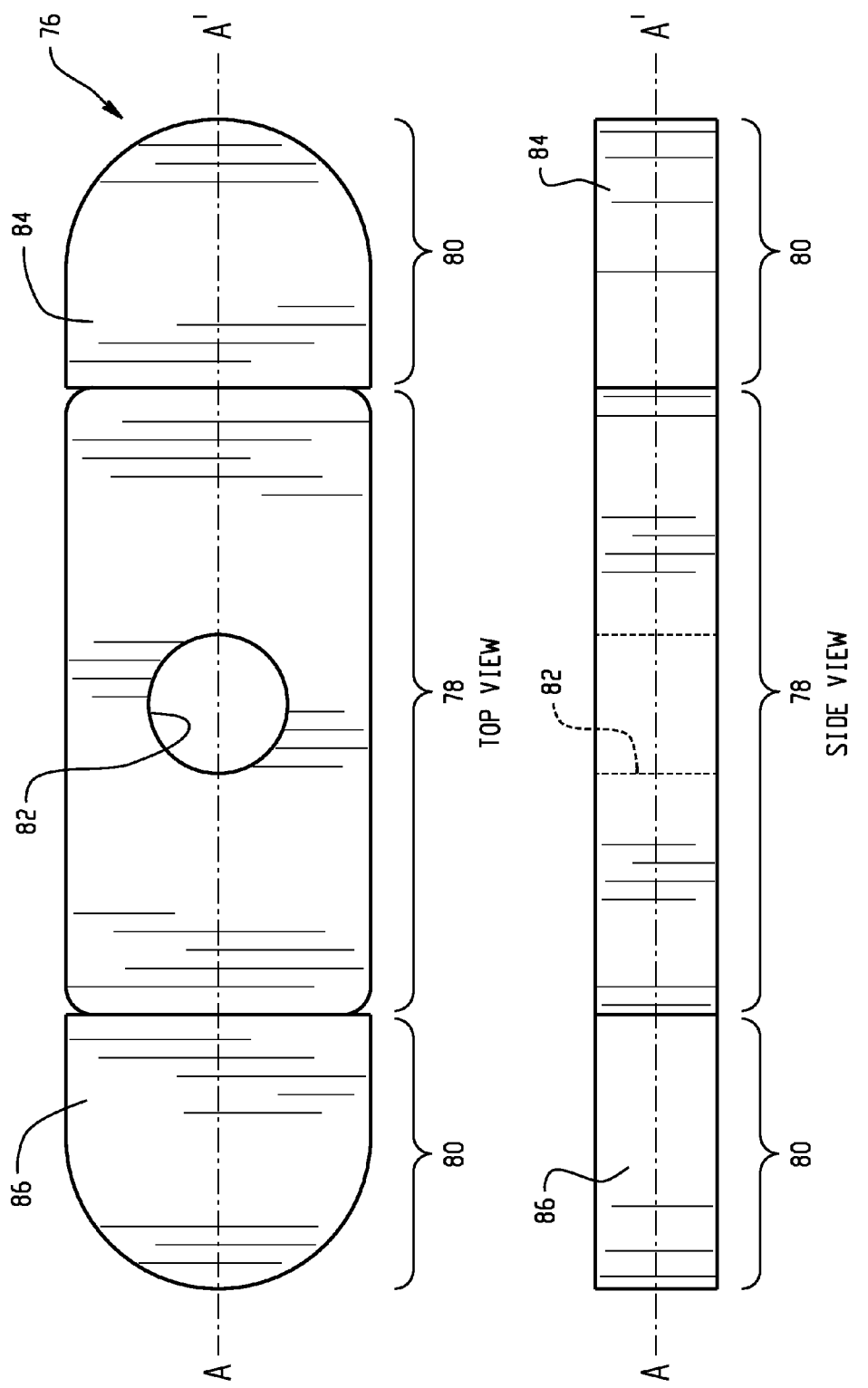

VARIABLE RESISTANCE STRUT ASSEMBLIES AND ARTICLES CONTAINING THE SAME

CROSS-REFERENCE TO RELATED APPLICATIONS

This application is a divisional application of U.S. patent application Ser. No. 12/210,674 filed on Sep. 15, 2009 which claims the benefit of U.S. patent application Ser. No. 11/077,179 filed on Mar. 10, 2005, which claims the benefit of U.S. Provisional Application Ser. No. 60/552,791 filed Mar. 12, 2004, the entire contents of which are hereby incorporated by reference.

BACKGROUND

This disclosure relates to variable resistance strut assemblies and articles that contain the same.

Strut assemblies are often used in automobiles to facilitate the opening, locking and positioning of doors, trunks, hoods, tail-gates, or the like. These assemblies generally do not offer opportunities for fine control. In addition, these assemblies are often susceptible to temperature changes and their performance tends to vary with temperature and other environmental conditions. The strut assemblies that are commerically available have functional attributes that are fixed during design and manufacture. These functional attributes cannot be controlled but can vary with wear and operating conditions. For example, the fluid used in a strut assembly may have a viscosity that is chosen to yield optimum performance in terms of the effort required to extend and retract the strut over a nominal range of temperatures. If however, the temperature drops below this nominal range, the viscosity increases, thereby increasing the effort required to extend and retract the strut.

It is therefore desirable to use strut assemblies that offer opportunities for fine control during opening and closing and which offer reproducible performance under a variety of different conditions.

SUMMARY

Disclosed herein is a strut assembly that comprises a piston in slideable communication with a housing. A seal is in operative communication with the piston and/or the housing. The seal comprises an active material adapted to control the motion of the piston.

Also, disclosed herein is a strut assembly that comprises a piston in slideable communication with a housing. The piston comprises a piston head having a channel that is in operative communication with a fluid disposed in the housing. A flow control element comprising an active material is disposed in the piston head. The flow control element is operative to control an effective diameter of the channel.

Also, disclosed herein is a strut assembly that comprises a piston that is in slideable communication with a housing. The piston comprises a piston head having a channel in operative communication with a fluid that is disposed in the housing. An elastic member and an active element are disposed in the channel. The active element is in operative communication with the elastic member and is operative to change the shape of the elastic member.

Also, disclosed herein is a method of operating a strut assembly comprising displacing a suspended body in mechanical communication with a piston. The piston comprises a piston head and a piston rod. An active material in operative communication with the piston head is activated and the motion of the suspended body is controlled.

The above features and advantages and other features and advantages of the present invention are readily apparent from the following detailed description of the best modes for carrying out the invention when taken in connection with the accompanying drawings.

DETAILED DESCRIPTION OF DRAWINGS

FIG. 3 is an exemplary depiction of a section of the piston head and the housing, wherein the piston head has a seal that comprises an active material. The figure schematically depicts the seal prior to activation;

FIG. 4 is an exemplary depiction of the piston head and the housing, wherein the piston head has a seal that comprises an active material. The figure schematically depicts the seal after activation;

FIG. 5 is an exemplary depiction of a top view and a side view of a flow control element that can be used to change the effective diameter of the channel;

DETAILED DESCRIPTION

Disclosed herein are strut assemblies that can be programmed or adjusted to display a selected level of resistance to displacement. The strut assembly comprises an active material (a shape memory material) that can be activated to vary the amount of the resistance to any displacement of the moving parts of the strut assembly. In one embodiment, the active material can change its shape, size or stiffness in response to the applied activation signal. Thus by applying an activation signal of a selected magnitude to the active material, a measured amount of resistance can be offered by the strut assembly to a displacing force.

The strut assembly is disposed between the suspended body and a supporting body and is in operative communication with the suspended body and the supporting body. The suspended body may be any device that utilizes spatial positioning such as a door in an automobile or a residential building; the hood or trunk of a automobile; the jaws of a vice or a press; the plates on machine tools such as injection molding machines, compression molding machines; arbors and chucks on lathes and drilling machines, or the like. The supporting body can comprise a door frame, an automobile frame, an aircraft frame, a ship frame, or the like. The suspended body is generally movable and can be displaced with respect to the supporting body, which generally occupies a fixed position. The suspended body can be opened or closed with respect to the supporting body.

In one embodiment, the active material that is used to offer resistance to the displacement of the strut assembly is generally contained inside of the housing of the strut assembly. In another embodiment, the active material can be disposed outside the strut assembly. The active materials are generally employed in a manner effective to increase the resistance to the motion of the piston inside the housing.

Figure 1:
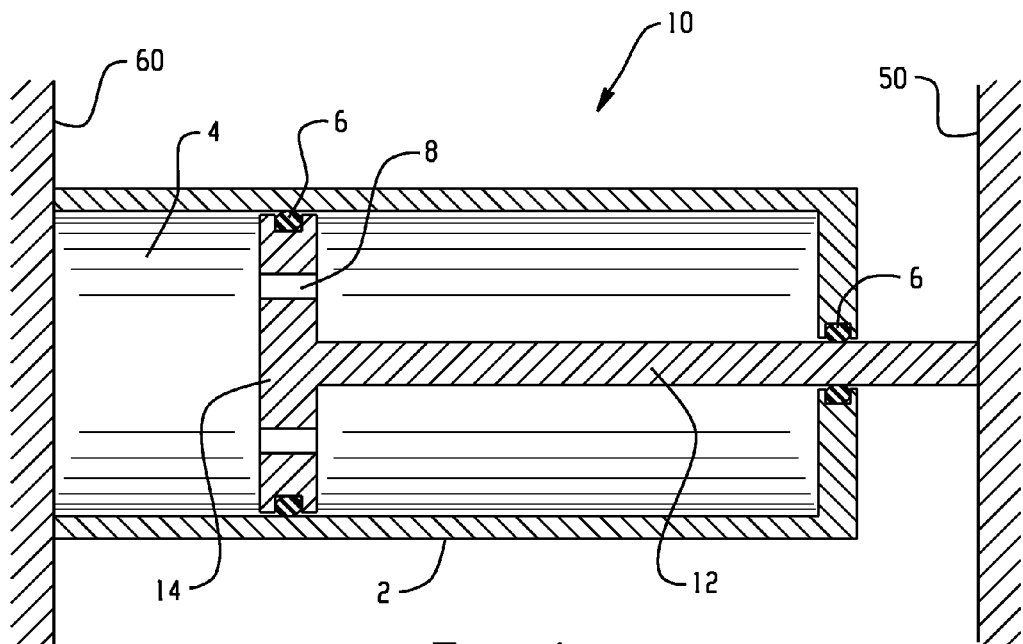
FIG. 1 is a depiction of an exemplary embodiment of a strut assembly comprising channels disposed in the piston head and seals disposed between the piston head and the inner surface of the housing.

With reference to the FIG. 1, which represents the prior art, a strut assembly 10 comprises a housing 2 that is in slideable communication with a piston 3. The piston 3 comprises a piston head 14 and a piston rod 12. The piston head 14 is fixedly attached to the piston rod 12. The housing 2 contains a fluid 4. The piston head 14 has disposed in it channels 8 that permit the passage of the fluid 4 across the piston head 14 as it is displaced in the housing 2. The channels 8 are disposed parallel to the piston rod 12 and have at least one axis of symmetry parallel to the direction of travel of the piston rod 12. The channel 8 may also have a convoluted path if desired. The channels 8 can have a cross-section area that has any desired shape. For example, the cross-sectional area of the channel can be circular, square, rectangular, or the like. Seals 6 are circumferentially disposed upon the piston head 14 and seal the space between the piston head 14 and the housing 2. Seals 6 can also be optionally disposed between the piston rod 12 and the housing 2. The seals 6 are concentric with the piston rod 12 and/or the housing 2. The strut assembly 10 is in operative communication with a supporting body 50 (e.g., the body of the vehicle) and is also in operative communication with a suspended body 60 (e.g., a panel that swings back and forth such as a door). The supporting body 50 and the suspended body 60 are disposed at opposing ends of the strut assembly 10. While the suspended body 60 is generally displaced with respect to the supporting body 50, it is possible to have both the supporting body 50 and the suspended body 60 displaceable with respect to each other.

As the piston rod 12 slides back and forth in the housing 2 during the expansion or contraction of the strut assembly 10, the fluid 4 is forced to flow through the channels 8 in the piston head 14. This flow is restricted by the channels 8 and the restricted flow gives rise to two forces that resist relative motion between the piston and the housing 2, an elastic force arising out of the compression of the fluid column that the piston head 14 is pushing against and a hydrodynamic force arising from the resistance to fluid flow through the channels 8 in the piston head 14. Friction brought on by the presence of the seal 6 between the piston head 14 and the inner wall of the housing 2, or between the piston rod 12 and the housing 2, also resists relative motion between the piston head 14 and the housing 2.

Figure 2:
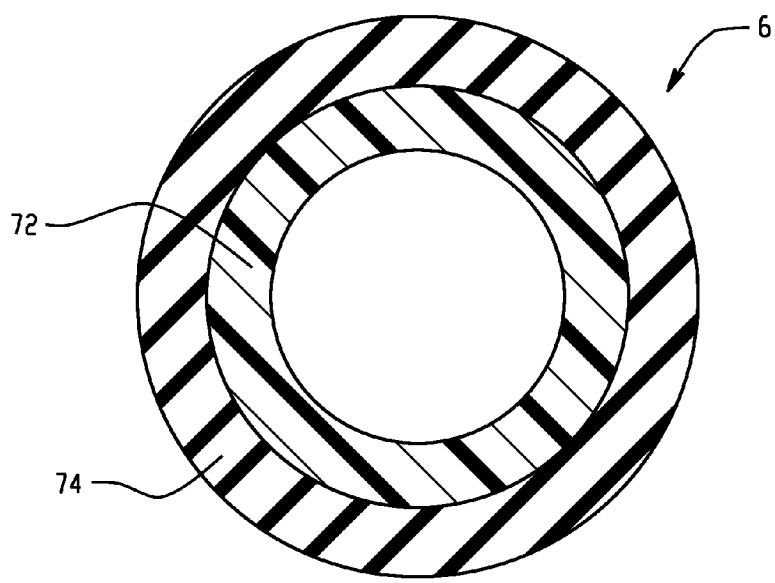
FIG. 2 is an exemplary depiction of a seal that comprises an active material that can be used to vary the friction between the piston head and the inner surface of the housing.

FIG. 2 represents one exemplary depiction of a seal 6 that comprises a smart material and which can be used to vary the friction between an inner surface of the housing 2 and the piston head 14 to control the motion of the piston 3. The seal 6 comprises a first layer 72 upon which is disposed a second layer 74. In one embodiment, the first layer 72 and the second layer 74 are concentrically disposed, with at least one surface of the first layer 72 in intimate contact with at least one surface of the second layer 74. The second layer 74 comprises a soft, easily deformable elastomer while the first layer 72 comprises an active material (shape memory material) whose geometry, dimensions and/or stiffness can be controlled by the application of an external stimulus.

Exemplary shape memory materials that can be used in the first layer 72 are shape memory alloys, electroactive polymers, hydrogels, or the like. Shape memory materials generally refer to materials or compositions that have the ability to revert to a specified original shape (or crystal structure) in response to an external stimulus, i.e., an activation signal even after they have been deformed from that original shape (or structure). Exemplary shape memory materials suitable for use in the present disclosure include shape memory alloys and ferromagnetic shape memory alloys and composites of the foregoing shape memory materials with non-shape memory materials, and combinations comprising at least one of the foregoing shape memory materials. In another embodiment, the class of smart materials used in the customizable strut assembly 10 are those that change their shape in proportion to the strength of the applied field but then return to their original shape upon the discontinuation of the field.

An exemplary smart material is a shape memory alloy. Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their elastic modulus (which influences its stiffness), yield strength, and shape orientation are altered as a function of temperature. Generally, in the low temperature, or martensite phase, shape memory alloys can be seemingly plastically deformed (about 8 to about 10% strain) and upon exposure to some higher temperature will transform to an austenite phase, or parent phase, returning to their shape prior to the deformation by recovering substantially all of the associated strain. Materials that exhibit this shape memory effect only upon heating are referred to as having one-way shape memory. Those materials that also exhibit shape memory upon re-cooling are referred to as having two-way shape memory behavior.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating.

Intrinsic and extrinsic two-way shape memory alloys are characterized by a shape transition both upon heating from the martensite phase to the austenite phase, as well as an additional shape transition upon cooling from the austenite phase back to the martensite phase. Active materials that exhibit an intrinsic one-way shape memory effect are fabricated from a suitably processed shape memory alloy that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active connector elements that exhibit the extrinsic two-way shape memory effects are composite or multi-component materials that combine a shape memory alloy composition that exhibits a one-way effect with another element that provides a restoring force to return the first plate another position or to its original position.

The temperature at which the shape memory alloy returns to its high temperature form when heated can be adjusted by changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a few degrees depending on the alloy composition.

Suitable shape memory alloy materials for fabricating the active materials include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, or the like, or a combination comprising at least one of the foregoing shape memory alloys. The alloys can be binary, tertiary, or any higher order so long as the alloy composition exhibits a shape memory effect, e.g., change in shape orientation, changes in yield strength, and/or flexural modulus properties, damping capacity, and the like.

The thermal activation signal may be applied to the shape memory alloy in various ways. It is generally desirable for the thermal activation signal to promote a change in the temperature of the shape memory alloy to a temperature greater than or equal to its austenitic transition temperature. Suitable examples of such thermal activation signals that can promote a change in temperature are the use of steam, hot oil, resistive electrical heating, or the like, or a combination comprising at least one of the foregoing signals. A preferred thermal activation signal is one derived from resistive electrical heating.

Exemplary elastomers that may be used in the first layer 72 are polybutadiene, polyisoprene, polybutadiene-polystyrene diblock elastomers, polystyrene-polybutadiene-polystyrene triblock elastomers, polystyrene-polyisoprene-polystyrene triblock elastomers, acrylonitrile-butadiene-styrene elastomers, or the like, or a combination comprising at least one of the foregoing elastomers.

The seal 6 is placed in the piston head 14, as shown in the FIG. 3. FIG. 3 is an exemplary schematic depiction reflecting the default configuration of the seal 6, where the first layer 72 is in its unactivated state. In this configuration, the resistance to displacement of the piston 3 in the housing 2 is dictated by the hydraulic requirements on the seal.

When the shape memory material in the first layer 72 is activated, there is a change in the area and/or pressure of contact between the seal 6 and the inner surface of the housing 2. Upon activation, the shape memory material expands in size or otherwise changes its configuration, such that the contact area and/or pressure between the second layer 74 of the seal 6 and the inner surface of the housing 2 increases. This change in the contact area and/or pressure permits an increase in the frictional resistance between the seal 6 and the housing 2, which permits control over the user effort required to produce displacement of the suspended body 60 that is in operational communication with the strut assembly 10. FIG. 4 is an exemplary depiction of the seal 6 after activation. In the FIG. 4, it can be seen that the area of contact between the seal 6 and the inner surface of the housing 2 has increased significantly when compared with the area of contact prior to activation as depicted in the FIG. 3.

In an exemplary embodiment, the shape memory material utilized in the first layer 72 can be manufactured from a shape memory alloy and can have a stent-like structure. This will permit the first layer 72 to exhibit the two-way or 'all-around' shape memory effect. The use of a shape memory alloy in the first layer 72 will permit the seal 6 to remember different shapes corresponding to different temperatures. Passage of an electric current through the shape memory alloy material can heat it to raise its temperature corresponding to the shape of the seal shown in FIG. 4. Moreover, controlling the current flowing through the element to achieve an intermediate temperature will result in an intermediate level of frictional resistance.

In addition to shape memory alloys, other shape memory materials that can be used to activate the seals 6 are electro-active polymers, magneto-rheological elastomers/foams, smart-material-based reconfigurable oil rings, hydrogels, or the like. As noted above, the seal 6, which is generally used to prevent leakage of fluid across the piston head 14 plays an additional role of controlling the frictional resistance to the relative motion between the piston 3 and housing 2. In one embodiment, other active seals can be used in the strut assembly 10 to facilitate controlling of the frictional resistance between the piston 3 and the housing 2. Exemplary locations for such seals 6 are between the piston rod 12 and the housing 2.

In yet another embodiment, the channel 8 in the piston head 14 may employ shape memory materials to control resistance to the displacement of the piston 3. In one exemplary embodiment depicted in the FIG. 5, the geometry of these channels 8 can be varied by applying an external stimulus to change the effective diameter of the channel 8 and therefore the resistance to displacement. As can be seen in the FIG. 5, the flow control element 76 has an axis AA' that passes through the center of the hole 82 in the flow control element 76. In one embodiment, the axis AA' is an axis that passes through the largest dimension of the flow control element 76. In another embodiment, the axis AA' divides the flow control element 76 into equal halves.

The flow control element 76 comprises one or more layers. In one embodiment, when the flow control element 76 comprises multiple layers, the layers can be concentric, i.e., they can share the same axis. The flow control element 76 can have any desired geometry, i.e., its cross sectional area can be rectangular, circular, square, or the like. In the exemplary embodiment depicted in the FIG. 5, the flow control element comprises multiple layers that are concentrically disposed. The flow control element comprises a first layer 78 and a second layer 80 that are in operative communication with each other. In one embodiment, at least one surface of the first layer 78 is disposed upon and in intimate contact with one surface of the second layer 80. The first layer 78 and/or the second layer 80 can comprise an active material. In one embodiment, the second layer 80 can comprise one or more active elements that comprise the active material. In another embodiment, the first layer 78 and/or the second layer 80 comprises two opposed active elements 84 and 86 that can be used to vary the effective diameter of the channel 8 by changing the position of the first layer 78. Opposed active elements as defined herein are those that act in an opposite fashion from each other. In other words, when element 84 expands as the result of being activated by an external stimulus, element 86 correspondingly contracts and vice versa.

Alternatively, the elements 84 and 86 can act in opposition to each other. In other words, when element 84 expands as the result of being activated by an external stimulus, element 86 correspondingly expands. Similarly, when element 84 contracts in size as the result of being activated by an external stimulus, element 86 correspondingly undergoes a contraction in size.

The flow control element 76 has disposed in it a hole 82, as shown in the FIG. 5. In one embodiment, the hole 82 is generally disposed in the geometric center of the flow control element 76. In another embodiment, the surface of the hole 82 is perpendicular to at least one axis of symmetry of the flow control element 76. In yet another embodiment, the surface of the hole 82 is perpendicular to the axis AA'. The hole 82 can be of a diameter that is greater than, equal to or less than the diameter of the channel 8.

Figure 6:
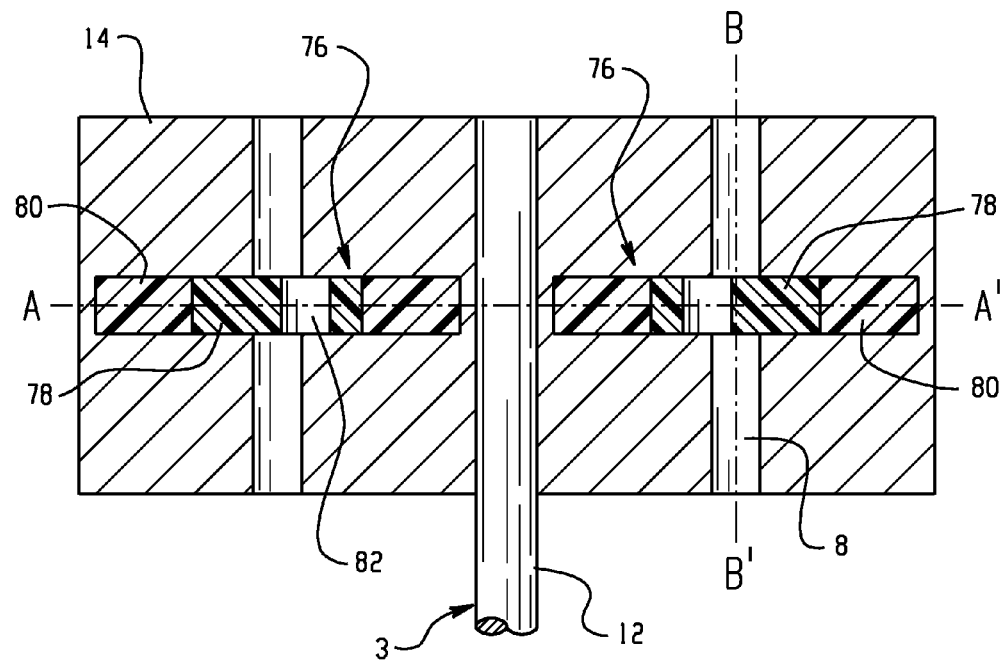
FIG. 6 is an exemplary depiction demonstrating one mode of using the flow control element to change the effective diameter of the channel.

The FIG. 6 depicts a section of the piston head 14 that comprises one flow channel 8 and the flow control element 76. The flow control element 76 is inserted adjacent to the channel 8 in the piston head 14 such that an axis AA' of the flow control element 76 intersects an axis BB' of the channel 8. In one embodiment, the axis AA' of the flow control element 76 is perpendicular to the longitudinal axis of the channel 8. In another embodiment, the axis AA' of the flow control element 76 is inclined at any desirable angle (not shown) to the longitudinal axis BB' of the channel 8. The longitudinal axis BB' of the channel 8 is an axis of symmetry that is parallel to the direction of travel of the piston rod 12.

With reference now to the FIG. 6, the flow control element 76 has a hole 82 that aligns itself coaxially with the channel 8. The hole 82 in the flow control element 76 can be moved relative to the channel 8 in the piston head 14. Thus by varying the magnitude of the external stimulus supplied to the opposing active elements, the effective diameter of the channel 8 can be changed. Changing the effective diameter of the channel 8 promotes variation in resistance to the displacement of the piston 3 and hence to the displacement of the suspended body 60 (not shown).

The default position (i.e. the position when neither of the active elements is activated) can be chosen on the basis of the desired functionality. For example, if the default position corresponds to a partially open channel 8 as shown in the FIG. 6, the hydrodynamic resistance can be increased or decreased as appropriate; if the default position corresponds to a fully open channel 8, the hydrodynamic resistance can only be increased; and if the default position corresponds to a fully closed channel 8, the hydrodynamic resistance can only be reduced but this arrangement can be used to hold the suspended body 60 (not shown) open in any desired position.

In one embodiment, the flow control element 76 can be disposed at different locations in the piston head 14. Instead of disposing the flow control element 76 at the center of the piston head 14 as depicted in the FIGS. 5 and 6, the flow control element 76 can be disposed proximate to the end of the piston head 14. In this embodiment, the geometry of the hole 82 in the flow control element 76 can be adjusted to afford a further control over the fluid flow resistance e.g., the channel 8 can have its shape adjusted to function as a converging or a diverging nozzle.

The active elements can be made of pre-strained shape memory alloy material, which is in its martensitic form in the default position. As discussed earlier, an electric current can be used to actuate these elements. Fine control over the channel's effective diameter can be exercised by controlling the current flowing through the two opposed active elements. Upon removing the electrical current, the flow control element 76 returns to its default position, thereby returning the effective diameter of the flow control element 76 to its original size.

Figure 7:
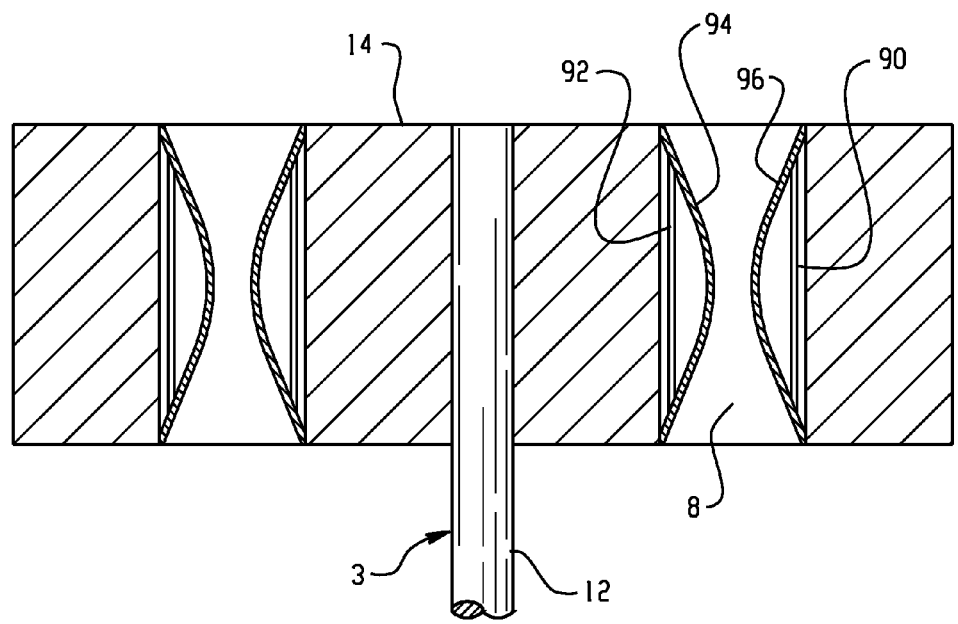
FIG. 7 is an exemplary depiction demonstrating the use of elastic members in operative communication with active elements to vary the effective diameter of the channel.

In yet another exemplary embodiment, depicted in the FIG. 7, active elements 90, 92 are mounted inside the channel 8 and can be used to vary the geometry and the effective diameter of the channel 8, thereby varying the hydrodynamic resistance offered to the motion of the piston 3. FIG. 7 reflects a section of the piston head 14 comprising the channel 8 in which one or more active elements 90, 92 are disposed. The active elements 90, 92 comprise active materials. The active elements 90, 92 can be in operational communication with each other if desired. While the channels 8 can have cross-sectional areas that are square or rectangular, channels employing other geometrical cross-sectional areas can be used. The active elements 90, 92 used in the channel 8 are generally manufactured from a shape memory alloy, although other smart material based actuators such as electroactive polymers, or the like, can also be used. The active elements 90, 92 are each in operational communication with elastic members 94, 96 respectively. While in the FIG. 7, the active elements 90, 92 together with the corresponding members 94, 96 are disposed on opposing surfaces of the rectangular channel 8, they may be disposed on adjacent surfaces.

In one embodiment, only a single active element 90 or 92 and a corresponding elastic member 94 or 96 may be disposed on a surface of the channel 8. In another embodiment, two or more active elements 90, 92 along with their corresponding elastic members 94, 96 can be disposed on the surfaces of the channel 8. As noted above, the respective active elements 90, 92 may be in operative communication with each other. In yet another embodiment, even when one or more active elements 90, 92 are disposed inside the channel 8, they may be activated individually independent of each other or cooperatively in combination with one another.

The elastic members 94, 96 can be deformed by the active elements 90, 92 either upon activation or upon deactivation. As noted above, the active elements 90, 92 are manufactured from a shape memory material that is in its martensitic form in the default configuration. Electroactive polymers can also be used as the active elements 90, 92. The default configuration is the configuration of the active elements 90, 92 prior to activation. In one embodiment, the elastic members 94, 96 are generally flat members having a length equal to the length of the channel 8 prior to activation. In another embodiment, the elastic members 94, 96 can extend outside the channel 8, e.g. the ends of the elastic member 94, 96 are wrapped around the end of the channel such that the elastic members 94, 96 remain centered with respect to the channel 8 even after activation. In one embodiment, at least one surface of an elastic member 94, 96 is disposed parallel to one inner surface of the channel 8 prior to activation. In another embodiment, the surface of the elastic member 94, 96 is curved prior to activation. A curved surface prior to activation is generally used to facilitate additional deformation of the surface of the elastic member 94, 96 during or after activation. Varying the curvature of the elastic member 94, 96 prior to activation can be advantageously used to vary the resistance to piston motion with minimal activation if desired. Each channel 8 comprises about 1 to about 4 elastic members 94, 96 that are in operative communication with an active element 90, 92.

The elastic members 94, 96 can be manufactured from spring steel and are of a thickness effective to allow for deformation by the active elements 90, 92 while offering sufficient stiffness to resist the forces exerted by fluid pressure and flow. When the elastic members 94, 96 are deformed, they reduce the effective cross-sectional area of the channel 8 thereby modifying the resistance to the displacement of the piston 3 of the strut assembly 10.

In one embodiment, in one manner of operating the strut assembly 10, the active elements 90, 92 in their default configuration do not deform the elastic members 94, 96. When a change in resistance to the motion of the suspended body 60 (not shown) is desired, the active elements 90, 92 are activated. Activation can be accomplished by resistively heating the active element 90, 92. Upon heating the active element 90, 92, it undergoes a transition from a martensitic phase to an austenitic phase. This change permits the active elements 90, 92 to shorten in length, which increases the curvature of the elastic members 94, 96 as shown in the FIG. 7. The increase in the curvature of the elastic members 94, 96 constricts the flow across the piston head 14 and accordingly changes the resistance to the motion of the suspended body 60.

When the external stimulus (e.g., the electrical current to the active element) is terminated, the restoring force exerted by the elastic members 94, 96 will reestablish the default configuration of the above arrangement. In one embodiment, the default configuration of the elastic members 94, 96 can be selected such that the flow of the fluid across the piston head 14 is partially blocked (as shown in the FIG. 7), fully blocked or completely unrestricted, and the geometry of the active element 90, 92 can be chosen accordingly. In another embodiment, the compositions of the shape memory alloys can be chosen such that the transition from martensitic to austenitic can occur because of operation temperature changes within the fluid and/or changes in the ambient temperature. In other words, there would not be any need for an external stimulus to be deliberately applied to activate the shape memory alloy.

In yet another embodiment, the elastic members 94, 96 may be supported by shape memory polymer backing elements (not shown) that provide a means of holding the changed configuration of the channel 8 even after the activation signal to the active elements 90, 92 is turned off. The pre-compressed backing elements can be softened when the configuration of the channel 8 is to be changed. The active elements 90, 92 may then try to regain their original size and in the process push against the elastic members 94, 96. When the elastic members 94, 96 have been adjusted to the desired position, the shape memory polymer is allowed to cool and regain its stiff form. In the stiff form, the shape memory polymer backing elements support the elastic elements against fluid pressure and flow forces, thereby providing a means for holding the changed configuration even after the activation signal to the active elements 90, 92 is removed or discontinued.

The variable resistance strut assemblies 10 can be advantageously used in articles such as automobiles, machine tools, residential and office buildings where resistance between suspended bodies (such as doors, windows, or the like) and a supporting body (such as door frames, or the like) is often desired. The resistance can be varied at any time during the life cycle of such articles. Further, the resistance can be varied manually or automatically by the use of computers. Feed back loops can also be used to vary the resistance systematically or in order to reproduce certain types of resistance under certain selected conditions and/or to compensate for variations in the operating conditions e.g. due to change in temperature, wear, or the like.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A strut assembly comprising:
   a piston in slideable communication with a housing, wherein the piston comprises a piston head having a channel in operative communication with a fluid disposed in the housing, wherein the channel is characterized by a cross-sectional area;
   an elastic member disposed in the channel; and
   an active element disposed in the channel and in operative communication with the elastic member, wherein the active element is operative to change the shape of the elastic member, and wherein changing the shape of the elastic member varies an effective cross-sectional area of the channel;
   wherein the elastic member includes at least one flat surface that is disposed parallel to at least one inner surface of the channel prior to activation.

2. The strut assembly of claim 1, wherein the cross-sectional area of the channel is one of square and rectangular.

3. The strut assembly of claim 1, further comprising a second elastic member and a second active element each disposed in the channel, wherein each elastic member is in operative communication with each active element respectively.

4. The strut assembly of claim 3, wherein the first elastic member and the second elastic member are secured to the piston head on opposing sides of the channel from one another.

5. The strut assembly of claim 3, wherein the first active element and the second active element are operative independently of one another to change the shape of the respective first elastic member and second elastic member.

6. The strut assembly of claim 3, wherein the first active element and the second active element are operative in opposition to each other to change the shape of the respective first elastic member and second elastic member.

7. The strut assembly of claim 1, wherein the active element is a shape memory alloy.

8. An article employing the strut assembly of claim 1.

9. The strut assembly of claim 1, wherein the elastic member provides a first level of resistance when the active element is at a first temperature and wherein the elastic member provides an increased level of resistance greater than the first level of resistance when the active element is at an increased temperature greater than the first temperature.

10. The strut assembly of claim 9, wherein the increased level of resistance of the elastic member is proportional to the increased temperature of the active element.

11. The strut assembly of claim 1, wherein the elastic member extends from one end of the channel to an opposing end of the channel.

12. The strut assembly of claim 11, wherein opposing ends of the active element are secured to the elastic member.

13. The strut assembly of claim 11, wherein the active element is disposed between the elastic member and a side of the channel defined by the piston head.

14. A strut assembly comprising:
   a piston in slideable communication with a housing, wherein the piston comprises a piston head having a channel in operative communication with a fluid disposed in the housing;
   a first elastic member and a second elastic member each disposed in the channel; and
   a first active element and a second active element each disposed in the channel and in operative communication with each elastic member respectively;
   wherein the first active element and the second active element are operative independently of one another to change the shape of the respective first elastic member and second elastic member.

15. A strut assembly comprising:
   a piston in slideable communication with a housing, wherein the piston comprises a piston head having a channel in operative communication with a fluid disposed in the housing, wherein the channel is characterized by a cross-sectional area;
an elastic member disposed in the channel; and
an active element disposed in the channel and in operative communication with the elastic member, wherein the active element is operative to change the shape of the elastic member, and wherein changing the shape of the elastic member varies an effective cross-sectional area of the channel;
wherein the cross-sectional area of the channel is one of square and rectangular.

16. The strut assembly of claim 15, wherein the elastic member comprises at least one flat surface that is disposed parallel to at least one inner surface of the channel prior to activation.

17. The strut assembly of claim 15, further comprising a second elastic member and a second active element each disposed in the channel, wherein each elastic member is in operative communication with each active element respectively.

18. The strut assembly of claim 17, wherein the first elastic member and the second elastic member are secured to the piston head on opposing sides of the channel from one another.

19. The strut assembly of claim 15, wherein the active element is a shape memory alloy.

* * * * *